US011340066B1

(12) United States Patent
Nour et al.

(10) Patent No.: US 11,340,066 B1
(45) Date of Patent: May 24, 2022

(54) METHODS AND SYSTEMS FOR TILT AND ACCELERATION MEASUREMENT BASED ON HALL EFFECT SENSORS AND ARTIFICIAL NEURAL NETWORK ALGORITHMS

(71) Applicant: KING ABDULAZIZ UNIVERSITY, Jeddah (SA)

(72) Inventors: Majid Nour, Jeddah (SA); Hatem Sindi, Jeddah (SA); Nihat Daldal, Bolu (TR); Kemal Polat, Bolu (TR)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/343,997

(22) Filed: Jun. 10, 2021

(51) Int. Cl.
*G01C 9/06* (2006.01)
*G01P 15/105* (2006.01)

(52) U.S. Cl.
CPC .............. *G01C 9/06* (2013.01); *G01P 15/105* (2013.01)

(58) Field of Classification Search
CPC .................................. G01C 9/06; G01P 15/105
See application file for complete search history.

(56) References Cited

U.S. PATENT DOCUMENTS

| 4,885,535 A | 12/1989 | Odagawa et al. |
| 5,365,671 A * | 11/1994 | Yaniger ................... G01C 9/14 33/366.23 |
| 5,646,349 A | 7/1997 | Twigg et al. |
| 6,131,457 A | 10/2000 | Sato |
| 6,139,053 A | 10/2000 | Knox |
| 6,301,795 B1 | 10/2001 | Kang |
| 6,470,580 B1 | 10/2002 | Ushihara et al. |
| 8,453,505 B2 | 6/2013 | Erdler et al. |
| 8,498,793 B1 | 7/2013 | Loomis |
| 2003/0024314 A1 * | 2/2003 | Akieda ................... G06F 3/011 73/514.31 |
| 2008/0301956 A1 | 12/2008 | Hong et al. |
| 2011/0254540 A1 * | 10/2011 | Jiang ....................... G01C 9/06 324/207.15 |
| 2012/0191379 A1 * | 7/2012 | Li ........................... G01P 1/127 702/41 |
| 2020/0011669 A1 * | 1/2020 | Seth ...................... G01C 25/005 |

FOREIGN PATENT DOCUMENTS

| DE | 102006031586 A1 | 1/2008 |
| DE | 102006007900 B4 | 4/2008 |

* cited by examiner

*Primary Examiner* — Xin Y Zhong
(74) *Attorney, Agent, or Firm* — WCF IP

(57) ABSTRACT

A sensor detects tilt and/or accelerations simultaneously and in a plurality of directions. The exemplary sensor comprises a magnet which is allowed to move in multiple directions within a space about which a plurality of Hall-effect sensors are arrayed. The magnet is mounted by a plurality of springs which limit the displacement of the magnet to the space within the circle of sensors. Continuous signals from the sensors change in response to a changing position of the magnet. These signals are evaluated by an artificial neural network (ANN) taught using validated tilt sensors. Angle and acceleration values are cleaned from vibration values using a Kalman filter.

11 Claims, 15 Drawing Sheets
(10 of 15 Drawing Sheet(s) Filed in Color)

METHODS AND SYSTEMS FOR TILT AND ACCELERATION MEASUREMENT BASED ON HALL EFFECT SENSORS AND ARTIFICIAL NEURAL NETWORK ALGORITHMS

FIELD OF THE INVENTION

Embodiments generally relate to inclinometers and accelerometers and, more specifically, sensors based on the Hall-effect.

BACKGROUND

A tilt sensor is used in situations where accurate positioning or continuous monitoring of angle with respect to gravity is required. Tilt sensors are in demand in many industrial applications from robotics to construction. A tilt sensor measures the angle relative to a horizontal position so that an imaginary line from the center of the earth serves as a reference. A traditional tilt sensor has a hollow cylindrical shape. Inside the cavity is a freely moving conductive material. This substance may be a mercury drop or a spinning ball, for example. There are poles made up of two conductors at one end of the recess. When the sensor is bent, the conductive moving material moves to this end and the two conductors short-circuit. Mercury was used quite often in older tilt sensor applications. However, due to its excessive toxicity, the use of mercury tilt switches has decreased considerably today. The advantage of using mercury is that the drop is dense enough that it does not bounce. In this way, the key is not affected by vibration. On the other hand, ball shaped sensors are easy to produce, do not crack, and do not cause environmental pollution.

An acceleration sensor is an element that senses and measures the acceleration and produces an electrical (analog or digital) output voltage proportional to the value of the acceleration. Acceleration occurs when there is a change in the speed of the object or the direction in which the velocity is directed. In addition to acceleration, an accelerometer is used to measure variable states such as impact, vibration, rotation, mechanical shock, tilt. Acceleration sensors have different methods of operation. Some acceleration sensors use a piezoelectric effect. Microscopic crystal structures are stretched by acceleration forces. This causes a voltage to be generated which correlates with the magnitude of acceleration. Another accelerometer technique relies on changes in capacitance. A capacitive effect occurs between two microstructures close to each other, and the capacitance value changes in response to acceleration with respect to the environmental frame of reference. The capacitance is monitored. As yet another technique, a diaphragm is used as a seismic mass. When an acceleration occurs, the distance between a stationary electrode and the seismic electrode changes. As the distance changes, the capacitance changes and a proportional output is obtained as acceleration.

Tilt sensors (i.e., angle sensors, inclinometers) and acceleration sensors (i.e., accelerometers) are sometimes distinct categories of sensors, although their applications sometimes overlap. Each category has different advantages. Tilt sensors may not work as accurately as accelerometers, but tilt sensors generally offer a simpler solution to measure motion and orientation. Another advantage of tilt sensors is that large enough tilt switches can self-power control. Accelerometers, on the other hand, have an analog or digital output, and extra circuitry is required to analyze the results. Acceleration sensors with analog output give a continuous voltage depending on the acceleration value. Digital acceleration sensors are available in models that support various interfaces for output (I2C, SPI, UART, etc. . . . ) as well as models that output in a modulated manner (e.g. PWM). The output signal of an accelerometer needs operations such as offset, boost, and filtering. For acceleration sensors with analog output voltage, the output signal can be positive or negative voltage depending on the direction of the acceleration. As with other sensors, the value for the analog-digital converter must be scaled and/or increased to achieve the maximum gain.

SUMMARY

A tilt sensor (i.e., slope sensor, inclinometer) is a device used to measure the tilt on many axes of a frame of reference. Tilt sensors measure an angular position relative to gravity and are used in many applications. Tilt sensors allow easy detection of direction or slope in the air. These sensors have a variety of applications. As an example of a practical application, the tilt sensor provides valuable information about both the vertical and horizontal tilt of an aircraft. This information helps the pilot understand how to deal with obstacles during flight.

In this disclosure, real-time measurement of tilt (i.e., inclination) and acceleration is achieved using a magnet's magnetic field and Hall-effect sensing. Multiple Hall-effect sensors with analog outputs (e.g., UGN-3503) are situated in a housing. The measures of the outputs vary according to the position, movement speed, and direction of a magnet arranged inside the array of Hall-effect sensors. For example, each of the Hall-effect sensors produce a 0-5 Volt analog voltage according to the instantaneous position of the magnet relative to the respective Hall-effect sensor. The magnet is mounted in such a way that allows the magnet to move according to the inclination of the overall mechanism (the overall tilt sensor) when the mechanism is moved angularly or when the speed of movement changes.

The analog signals of the Hall-effect sensors are received by a microcontroller. From these plural inputs, the microcontroller outputs one or more signals describing the tilt and/or acceleration. The microcontroller may contain a universal asynchronous receiver/transmitter (UART) or universal synchronous/asynchronous receiver/transmitter (USART) for this purpose. Angle and acceleration values are continuously produced in real time according to the movement of the mechanism.

During manufacture or for purposes of calibration, the signals from the Hall-effect sensors may be transmitted to a computer (or computers) capable of supporting an artificial neural network (ANN). One or more reference inclinometers and one or more reference accelerometers are positioned with the tilt sensor being calibrated such that all of the sensors are subject to precisely the same environmental movements. The signals from the reference sensors provide target values and are transmitted to the ANN and used to train the ANN for conversion of the Hall-effect signal sensors to meaningful and accurate angle and acceleration measures. After training is complete, the reference sensors are no longer needed, and the trained ANN algorithm is transferred to the microcontroller which can perform the signal conversions at high speed without the need for a computer. The microcontroller may include a Kalman filter software structure such that the mechanism avoids noise in the output data resulting from instant vibrations. Increasing the microcontroller operating speed also has the advantage of increasing the measurement speed of the system.

One of the advantages of exemplary sensors according to this disclosure is cost. Industrial sensor prices that provide high accuracy acceleration and slope information are traditionally very expensive. By contrast, exemplary sensors disclosed herein may be produced at a small fraction of the cost of traditional sensors. Yet the exemplary sensor herein provides high accuracy information on inclination and acceleration using e.g. spring properties and Hall-effect sensors. Sensitivity of sensors according to this disclosure may be varied simply by changing the number of Hall-effect sensors in a single unit. As a general matter, the measurement sensitivity may be increased by increasing the number of hall-effect sensors placed around the magnet. Measurement accuracy, on the other hand, may be increased by increasing the magnet weight and/or increasing the number of springs of the mount holding the magnet. Additional springs may be affixed to, for example, corners of a cube magnet in addition to springs affixed to the magnet faces.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
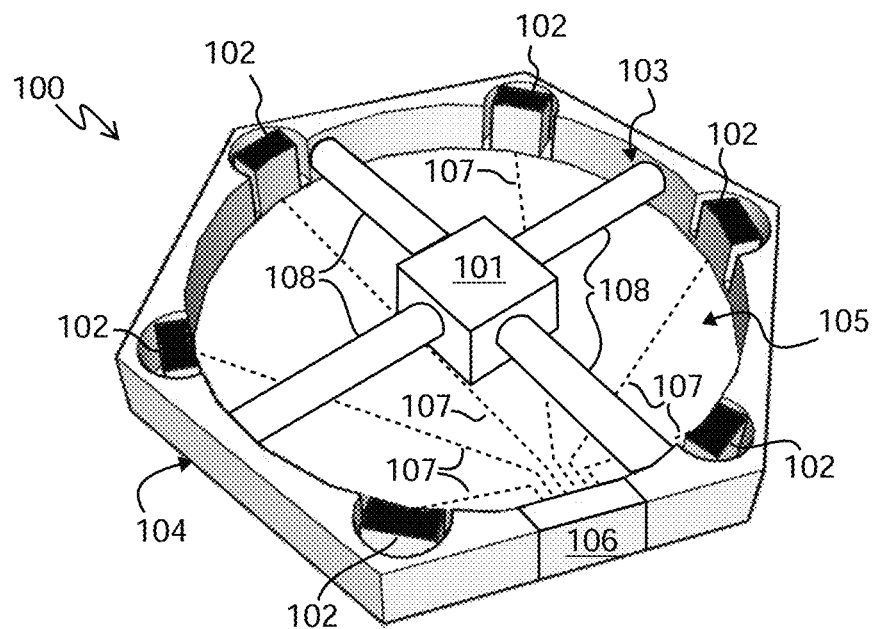
FIG. 1 is an exemplary sensor with internal components made visible.
Figure 2:
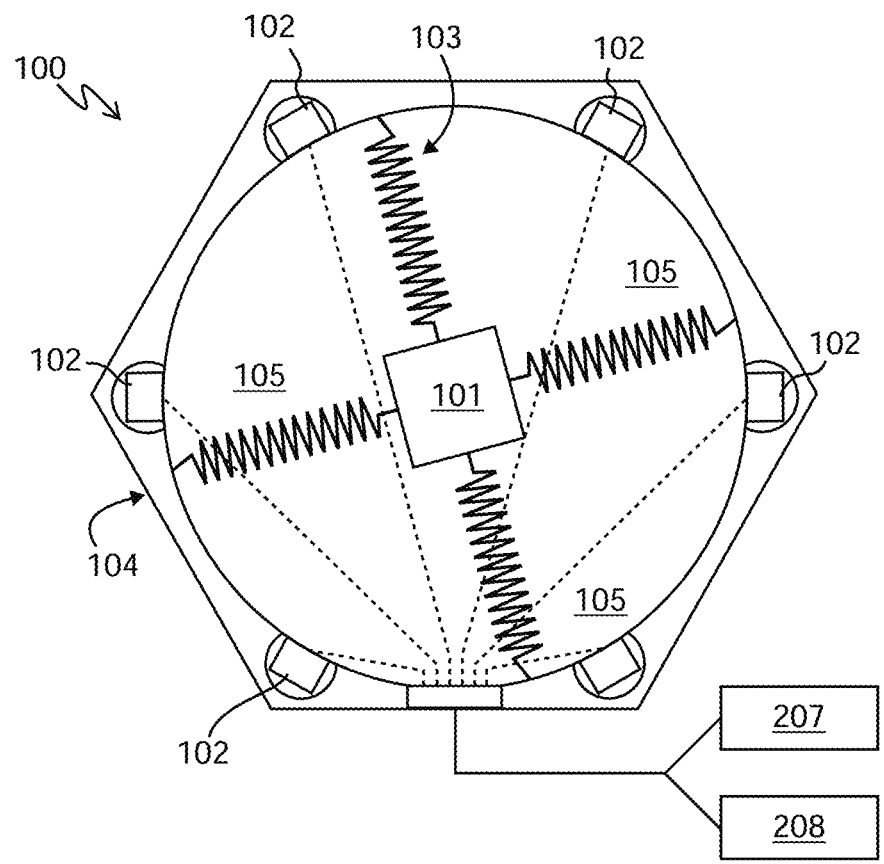
FIG. 2 is the sensor of FIG. 1 shown from a top plan view.

FIGS. 1 and 2 depict an exemplary sensor 100. The sensor 100 comprises a magnet 101, a plurality of Hall-effect sensors 102, and a mount 103. A body/housing 104 may be considered a further element or a subpart of the mount 103. For clarity throughout this disclosure, the word "sensor" when not preceded by "Hall-effect" refers to a sensor 100 or similar and not its Hall-effect sensor subcomponent.

The Hall-effect sensors 102 are arrayed around a space 105. The space 105 contains the magnet 101. That is to say, the magnet 101 is positioned in the space 105. The mount 103 is configured to permit movement of the magnet 101 relative to the plurality of Hall-effect sensors 102 and limits displacement of the magnet 101 to the space 105. For purposes of this disclosure, movement of the magnet 101 relative to the Hall-effect sensors 102 is equivalent to movement of the Hall-effect sensors 102 relative to the magnet 101. The nominal difference is only the frame of reference. The Hall-effect sensors 102 and magnet 101 generally share the same geometric plane. The housing 104 may include a smooth surface floor and ceiling (not shown) to restrict the magnet 101 to such geometric plane.

The sensor 101 is configured to detect tilt and/or acceleration based on the distances (or distance ratios) of the magnet 101 to each respective Hall-effect sensor 102. A change in the relative positions of any Hall-effect sensors 102 with respect to the magnet 101 (i.e., the magnet 101 with respect to the Hall-effect sensors 102) is translatable to a change in tilt. Changes in the relative positions/distances over time are translatable to changes in acceleration. In short, the plurality of Hall-effect sensors 102 output signals that change in response to changes in distance of the magnet 101 to respective ones of the plurality of Hall-effect sensors 102. The output signals of the Hall-effect sensors 102 are used to produce tilt and/or acceleration measures.

The sensor 100 further comprises a microcontroller 106 configured to receive the signals from the Hall-effect sensors 102 via signal wires 107. The signals from the Hall-effect sensors 102 may be, for example, continuous analog voltage signals (e.g., 0-5 V). As depicted in FIGS. 1 and 2, the microcontroller 106 may be positioned on or in the body 104, and the signal wires 107 may run in or along a bottom surface of area 105. Other positions and configurations are also acceptable. For instance the microcontroller may be positioned under the plane of the Hall-effect sensors. Irrespective of where the microcontroller 106 is arranged, the microcontroller 106 is configured to convert the signals from the Hall-effect sensors 102 to tilt and/or acceleration measures. To this end, an exemplary microcontroller 106 comprises a universal synchronous/asynchronous receiver/transmitter (USART) or a universal asynchronous receiver/transmitter (UART) for outputting the tilt and/or acceleration measures. Tilt and acceleration measures may be output simultaneously to, for example, a computing device 207 and/or display 208.

The Hall-effect sensors 102, and the sensor 101 as a whole, is configured to allow real-time measurements. The number of hall-effect sensors 102 may vary among embodiments, but six sensors 102 (as illustrated) is exemplary. Suitable commercially available Hall-effect sensors include UGN-3503 with an analog output.

The mount 103, as mentioned above, is configured to mount the magnet 101 within the sensor 100 in such a manner that movement relative the Hall-effect sensors 102 is permitted. The magnet 101 may be either a cube magnet, as depicted, or a sphere magnet. Other magnet configurations may be used in the alternative. The mount 103 comprises elastic elements, in particular springs 108. As depicted, four springs 108 are organized into two pairs. The two springs 108 of each pair are arranged to have opposing return forces, i.e., when one spring is elongated the opposing spring is compressed. Each of the springs 108 is connected (e.g., attached) to the magnet 101 at one end and to an inner side of the body 104 at the opposite end. The specific connection points between the springs 108 and body 104 may vary among embodiments. Any effects the springs 108 have on the magnetic field forces detected by the Hall-effect sensors 102 are accounted for by the artificial neural network (ANN) discussed in greater detail below.

In a state of use, movement of the sensor 100 according to the slope of the environment results in movement of the magnet. The magnet moves with the acceleration of gravity and applies different amounts of force to the springs. The distance of the magnet to the respective Hall-effect sensors changes according to the tension and pull of the respective springs. According to the distance ratio of the magnet to the Hall-effect sensors, an analog voltage in the range of e.g. 0-5V is read from each Hall-effect sensor's output. When the sensor 100 is moved angularly, the movement speed of the magnet changes from one point to another point according to the movement speed of the sensor 100. Here, the magnet moves between Hall-effect sensors according to the ambient inclination and motion acceleration, and each sensor instantly produces analog output values in the range of 0-5 V according to the magnet position. The data from the Hall-effect sensors is continually received at the microcontroller 106.

Figure 3:
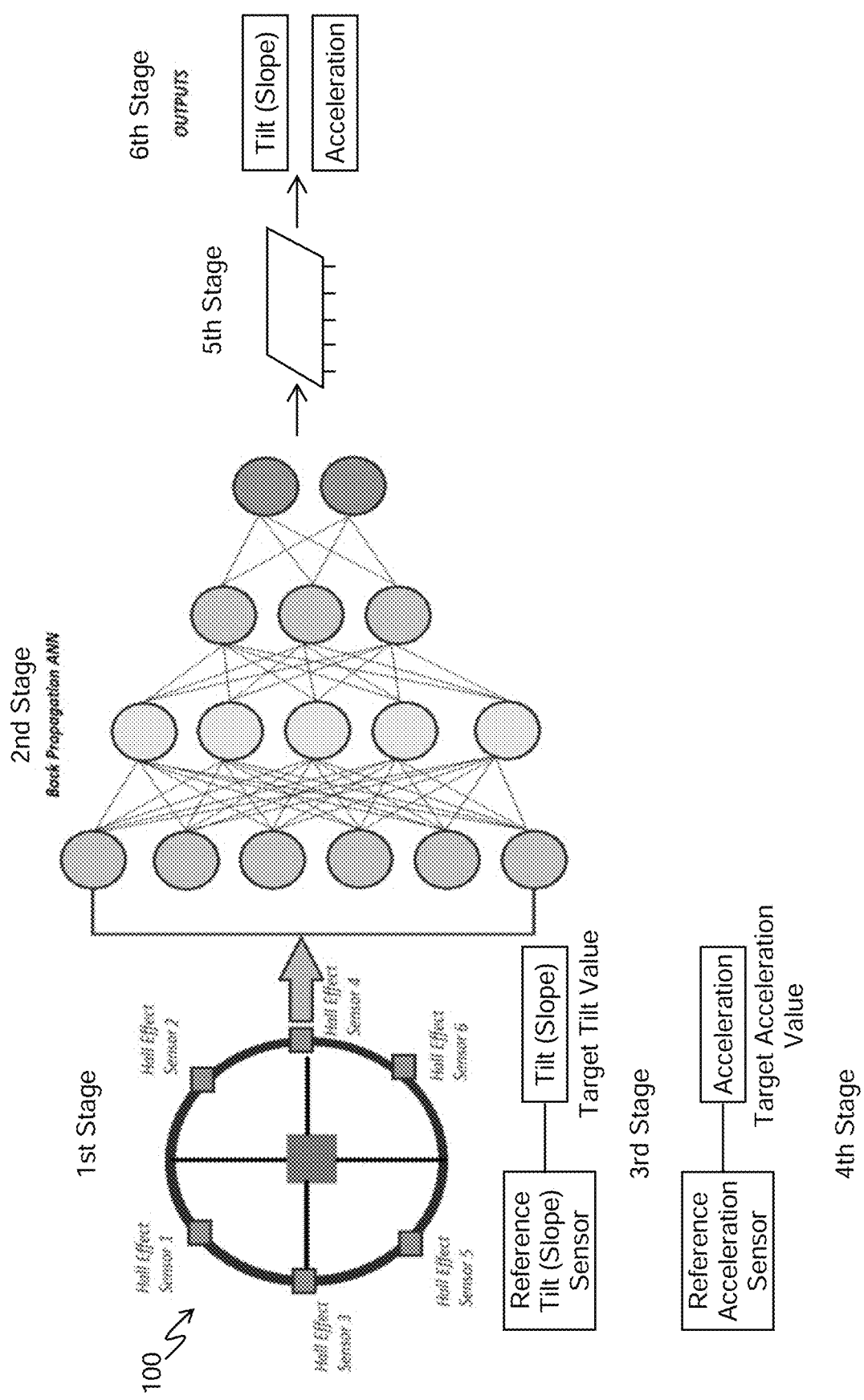
FIG. 3 is a block diagram of an exemplary production/calibration process.
Figure 4:
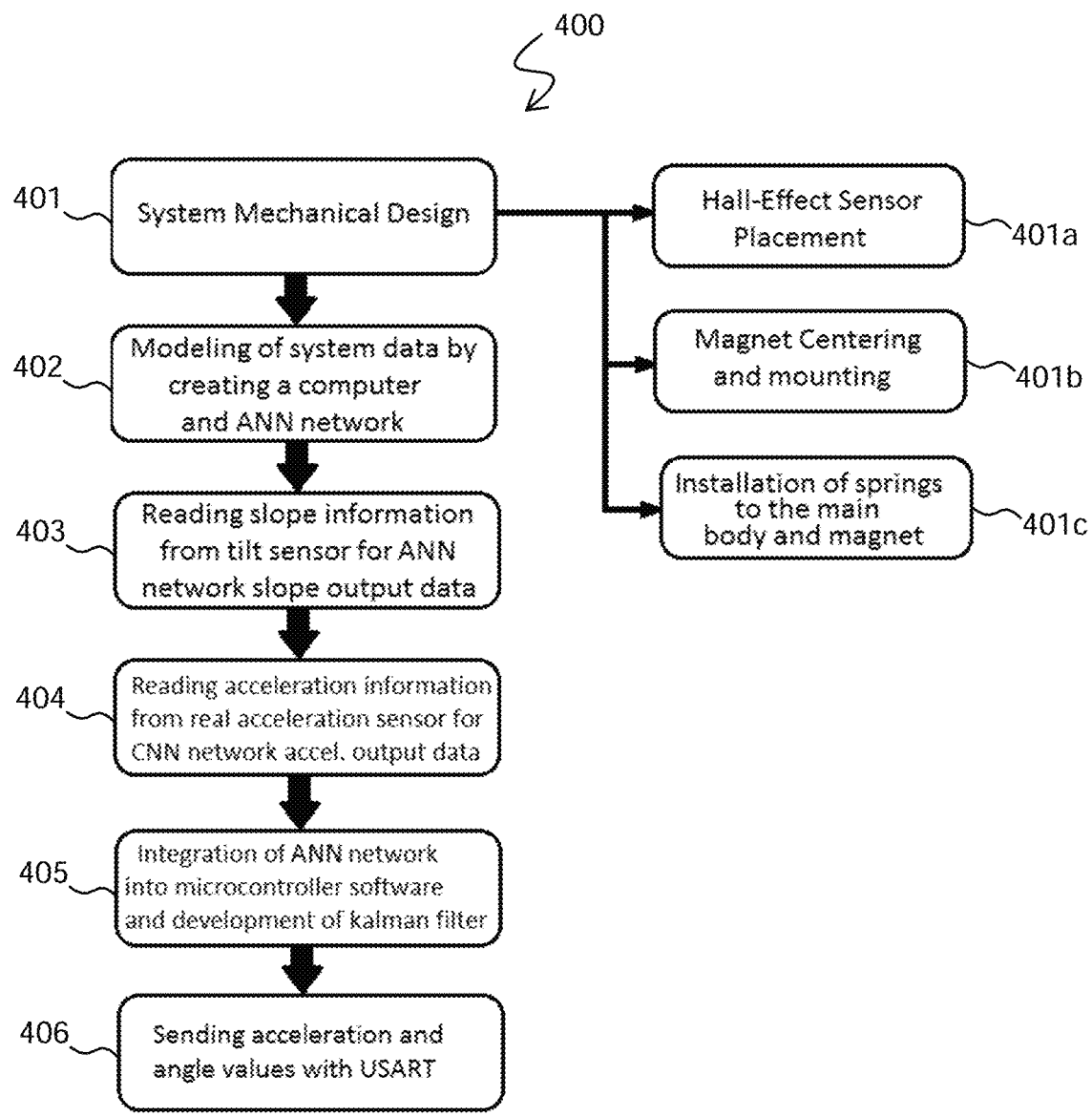
FIG. 4 is a flowchart for production of an exemplary sensor.

FIG. 3 is a block diagram illustrating an exemplary production/calibration process which ultimately facilitates the conversion of the analog signals from the Hall-effect sensors to accurate tilt/angle measures. FIG. 4 depicts the same process in the form of a flowchart.

FIG. 3 breaks down sensor production/calibration into six stages for ease of discussion. The first stage includes Hall-effect sensor placement and selection of magnetic dimensions. In the second stage, an artificial neural network is created. The voltage outputs of the Hall-effect sensors are one of the inputs to artificial neural networks. In the third stage, real reference tilt information is obtained with a real pre-validated reference tilt sensor. Its real reference values provide another input to the ANN. In the fourth stage, reference acceleration measurement values are obtained by performing real acceleration measurement with a pre-validated reference accelerometer. Its real reference values provide a third input to the ANN. In the fifth stage, after the artificial neural network model has been created and trained, the network's algorithm is incorporated into a microcontroller. In the sixth stage, accurate acceleration and slope measurements are obtained directly from the trained sensor.

Block 401 is the assembly of the mechanical components, e.g., as depicted in FIGS. 1 and 2. Block 401 includes, for exemplary illustrations, three subblocks. Block 401a is the Hall-effect sensor placement. As depicted in FIGS. 1 and 2, six Hall-effect sensors are placed symmetrically about an annular body. Block 401b is the centering of the magnet within the space surrounded by the Hall-effect sensors. Block 401c is the completion of mounting, namely installation of the springs to the main body and the magnet.

Figure 5A:
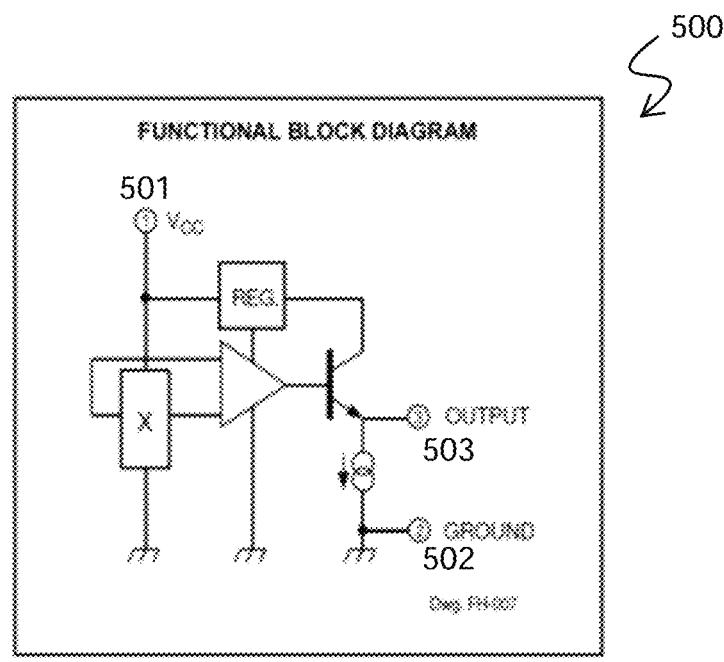
FIGS. 5A and 5B are exemplary Hall-effect sensor structures.
Figure 5B:
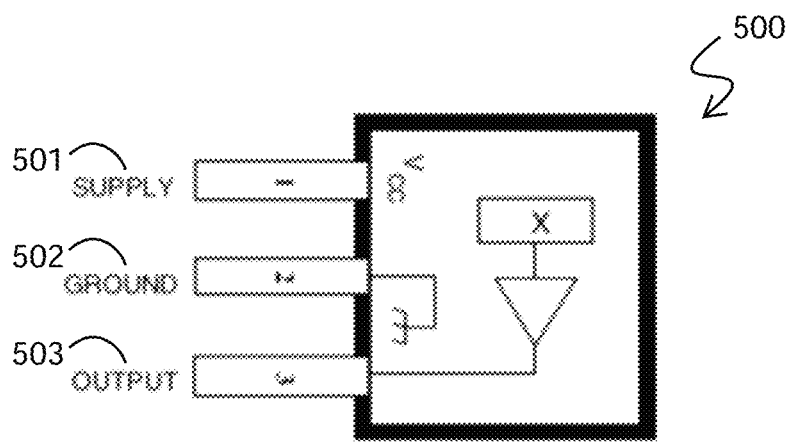

FIGS. 5A and 5B depict exemplary Hall-effect sensor structures. Exemplary Hall-effect sensors include but are not limited to UGN3503LT, UGN3503U, UGN3503UA, and UGN3113 Hall-effect sensors. Exemplary Hall-effect sensors such as these accurately track extremely small changes in magnetic flux density—changes generally too small to operate Hall-effect switches. As motion detectors, gear tooth sensors, and proximity detectors, they are magnetically driven mirrors of mechanical events. As sensitive monitors of electromagnets, the Hall-effect sensors effectively measure a system's performance with negligible system loading while providing isolation from contaminated and electrically noisy environments.

In FIGS. 5A and 5B, the UGN Hall-effect sensor 500 is a 3-pin field-effect sensor that is connected to a supply 501 and ground 502 and produces an analog voltage output 503 according to the magnetic field strength. The sensitivity value is 1.30 mV/Gauss, for example. Hall-effect sensor output voltages from a single UGN3113 Hall-effect sensor collected empirically according to angular displacements in a prototype sensor 100 and ADC values measured with a microcontroller are given in Table 1.

TABLE 1

Hall-effect sensor output voltages according to angular displacements in an exemplary sensor and ADC values measured with the microcontroller

| Angle | Magnet Total movement | Hall sensor output voltage | 10bit ADC Value |
|---|---|---|---|
| 0 | 5.26 mm | 3.81 V | 780 |
| 15 | 5.61 mm | 3.9 V | 797 |
| 30 | 6.00 mm | 4 V | 818 |
| 45 | 6.06 mm | 4.015 V | 821 |
| 60 | 5.84 mm | 3.96 V | 810 |
| 75 | 5.47 mm | 3.86 V | 789 |

Figure 5C:
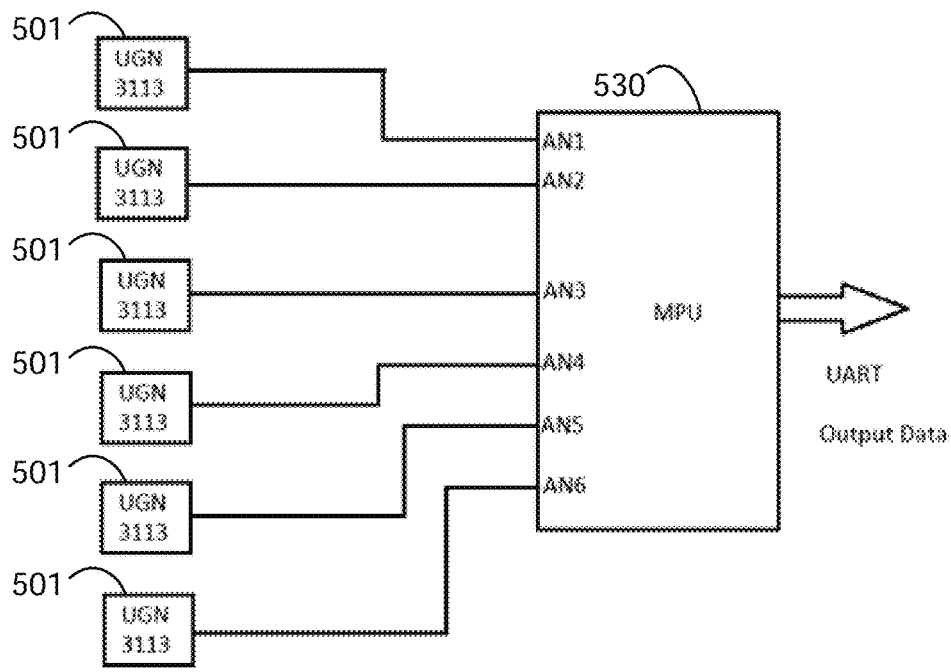
FIG. 5C shows six Hall-effect sensors connected with a microprocessor.

FIG. 5C depicts six Hall-effect sensors 500 (e.g., UGN 3113) wired respectively to six input pins of a microprocessor (MPU) 530. To minimize cost, a microprocessor may be selected with the minimal number of input pins necessary to support a corresponding number of Hall-effect sensors for the given embodiment.

Figure 6A:
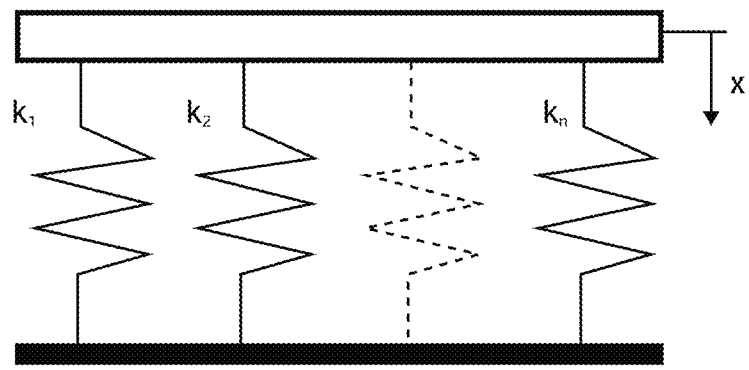
FIGS. 6A and 6B are schematics of spring connections with respective spring variables.
Figure 6B:
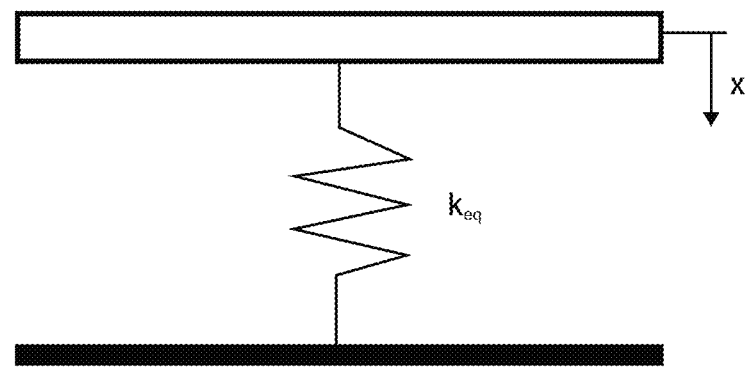

FIGS. 6A and 6B show springs variables and connections schematically, in connection with block 401c of FIG. 4. Exemplary springs for embodiments include but are not limited to helical springs. Generally, helical springs can be found in two different configurations in mechanical systems: in parallel and in series. The springs in a sensor 100 (FIG. 1) are arranged in parallel. The corresponding schematic appears in FIG. 6A, where the positive integer n is 4. In the mechanical system of sensor 100, the amount of migration (displacement) in spiral springs that are arranged in parallel is equal and has a value of x. The sum of the reaction forces (F) and resulting equivalent spring rigidity ($k_{eq}$, FIG. 6B) are therefore calculated as follows:

$$\sum F = k_1 x + k_2 x + \ldots \ldots + k_n x = \left(\sum_{i=1}^{n} k_i\right) x = k_{eq} x \rightarrow k_{eq} = \sum_{i=1}^{n} k_i$$

In addition, helical spring stiffness/hardness depends on spring material and geometric factors. Keq for helical springs under axial loading can be expressed as follows:

$$k_{eq} = \frac{Gd^4}{8nD^3}$$

where G is the shear modulus, n is the number of active turns, d is the wire diameter, and D is the average spring diameter.

Referring again to FIG. 4, Block 402 is creation of an artificial neural network (ANN). The ANN may be initially implemented in a computer, such as with an ANN program toolbox, and subsequently transferred to the microcontroller. Values from the sensor plane (that is, the Hall-effect sensors) are applied as input to an ANN network. An optimal network condition may be determined by changing (e.g., iteratively) the network properties in a series of experimental studies. The network properties that may be varied include but are not limited to number of hidden layers, algorithms, and methods.

Block 403 is a training step. A pre-validated tilt sensor (e.g., a SCA100T inclinometer) is paired with the sensor according to present embodiments, and both the pre-validated sensor (providing target teaching data) and the sensor to be trained are subject to the same changes. When the sensors are moved angularly, the real angle values are read from the pre-validated sensor that makes real precise angle measurements for the same movements to which the sensor to be trained are subjected. At the same time, data is collected from the collection of Hall-effect sensors.

Block 404 is another training step, this time with a pre-validated accelerometer. The pre-validated accelerometer is paired with the sensor according to present embodiments, and both the prevalidated sensor (providing target teaching data) and the sensor to be trained are subject to the same changes. When the sensors are moved angularly, the acceleration values are read from the pre-validated sensor that makes real precise acceleration measurements for the same movements to which the sensor to be trained are subjected. At the same time, data is collected from the collection of Hall-effect sensors.

Blocks 403 and 404 may be performed concurrently. At their completion, the ANN is trained and ready for implementation in a finalized form.

Figure 7:
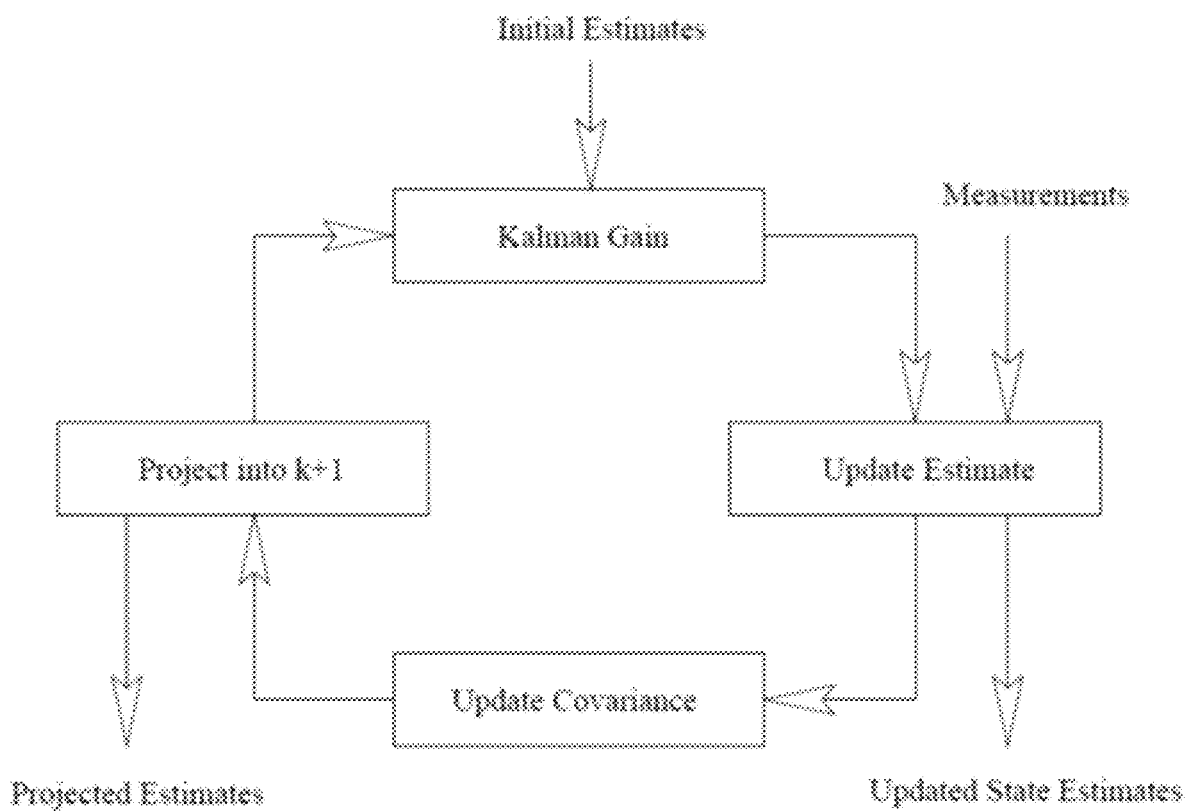
FIG. 7 is a block diagram of an exemplary Kalman filter.

Block 405 incorporates the finalized ANN into microcontroller software. At this stage, vibration values may remain an issue. Angle and acceleration values may be cleaned from vibration values by inclusion of a Kalman filter in the microcontroller in order to obtain more stable output values. An exemplary Kalman filter structure is disclosed in Tony Lacer, Chapter 11, "Kalman Filter"; http://web.mit.edu/kirtley/kirtley/binlustuff/literature/control/Kalman %20filter.pdf. A corresponding block diagram for such a Kalman filter is depicted in FIG. 7. The Kalman filter is configured to prevent data corruption in vibrations by obtaining constant values in sudden changes between the previous and next values of the data.

For an exemplary sensor 100 that may be subject to sudden movement, an exemplary microcontroller should not include crystal so that jolts do not affect the oscillator structure. Rather, an internal oscillator is preferred in such applications. A crystal type oscillator may be used in microcontrollers where the application is such that the sensor is not expected to be subject to sudden movements and jolts. Depending on the use scenario, measurement sensitivity of a sensor may be increased by increasing the number of Hall-effect sensors beyond e.g. the six depicted in the illustrated embodiments of this disclosure. In such case, a microcontroller with a higher port numbers may also be required, depending on the total number of Hall-effect sensors. Conversely, costs may be minimized by using fewer Hall-effect sensors and a microcontroller with correspondingly fewer ports.

Block 406 is the culmination of the calibration and reflects achievement of the desired output from the microcontroller and the overall sensor of which it is part. Stable angle and acceleration values are transmitted at e.g. 500 ms intervals to be sent to other units as USART. At this stage, the angle and acceleration values are transmittable at e.g. 19200 baus/rate.

After an ANN is trained in connection at least one exemplary sensor according to the procedure 400, a plurality of further sensors produced according to the same mechanical specifications may be manufactured to incorporate the same ANN in their respective microcontrollers. Retraining for each sensor is not necessary provided the mechanical specifications match among the batch of sensors. The spring properties must be the same in every sensor structure using the same ANN, and it is important that the springs work elastically within the specified strength range. The life of a single sensor is partly determined by the life of the elastic behavior of the springs. After the elastic behavior deteriorates over extended use, replacement of the sensor is recommended to avoid errors in the measurement values in long periods.

EXAMPLES

The following discussion and corresponding figures present test data used to assess exemplary system dimensions and spring lengths, for example, as well as accuracy of results from the sensor. For purposes of the examples, the stress force of the springs was 40 MPascals. The stress and deformation tests in the springs were performed with reference to gravity acceleration according to the movement angles. According to the range of motion of the springs, the approach range of the magnet to the Hall-effect sensors was determined, and accordingly the sensor output values were estimated. In the analyzes, spring and magnet weight data were used which resulted in a maximum range of 5 mm movement of the magnet toward any one of the sensors from a symmetrical center equilibrium position. The area enclosed by the ring of Hall-effect sensors was 5 cm. The cube magnet was 1 cm in length, width, and height. With the magnet at the center of the sensor, all four springs measure 2 cm starting length. The six Hall-effect sensors were arranged symmetrically about the center of the sensor, each 60 degrees rotation from the adjacent Hall-effect sensor to either side. The Hall-effect sensors and magnet are all positioned in the same geometric plane. The surface supporting the magnet from the underside was smooth with negligible friction.

Figure 8:
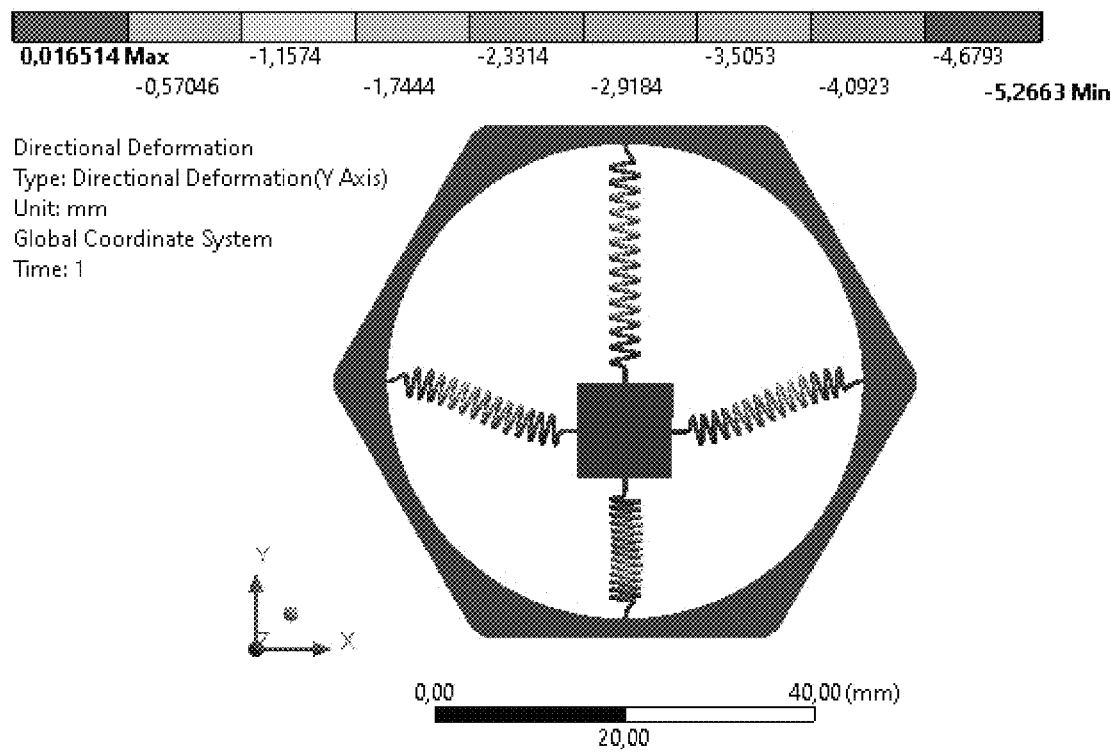
FIG. 8 displays maximum displacement information perpendicular to the ground.

FIG. 8 shows a display of maximum displacement information perpendicular to the ground. According to the analysis in FIG. 8, the maximum displacement while perpendicular to the ground was 5.26 mm. It fulfilled a requirement to be minimum 5 mm.

Figure 9:
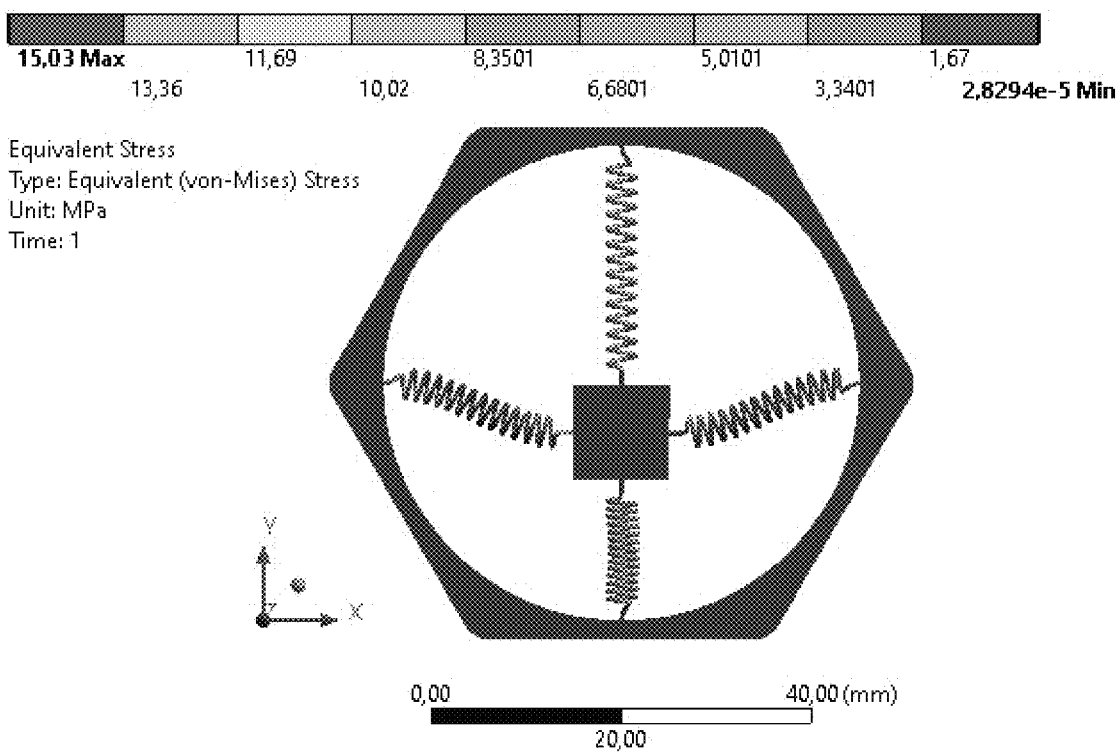
FIG. 9 is equivalent stress distribution in springs perpendicular to the ground.

FIG. 9 shows the equivalent stress distribution in the springs while perpendicular to the ground. According to the Von-Mises equivalent stress distribution, the stress force must exceed 40 Mpascals for the springs to deform. According to the analysis, a maximum of 16 Mpascals was measured. In this case, it has been observed that the springs operate in the elastic region.

Figure 10A:
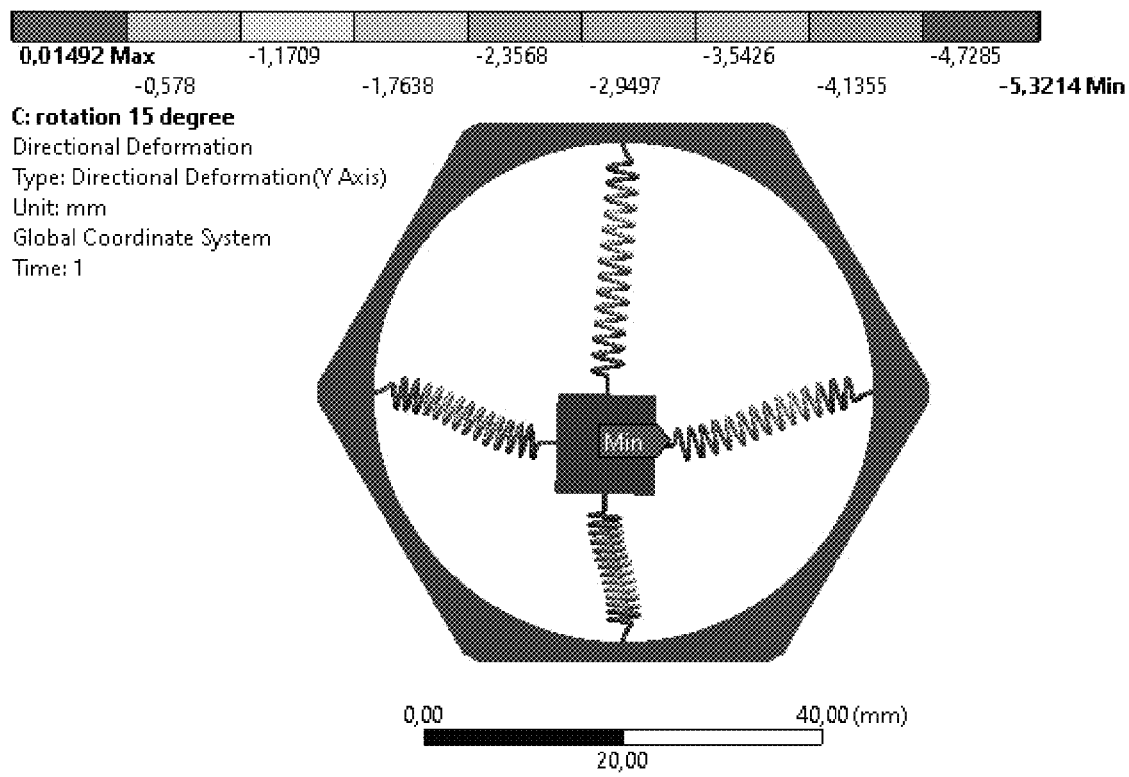
FIGS. 10A, 10B, and 10C are analysis of the system with a rotation of 15 degrees according to gravity.
Figure 10B:
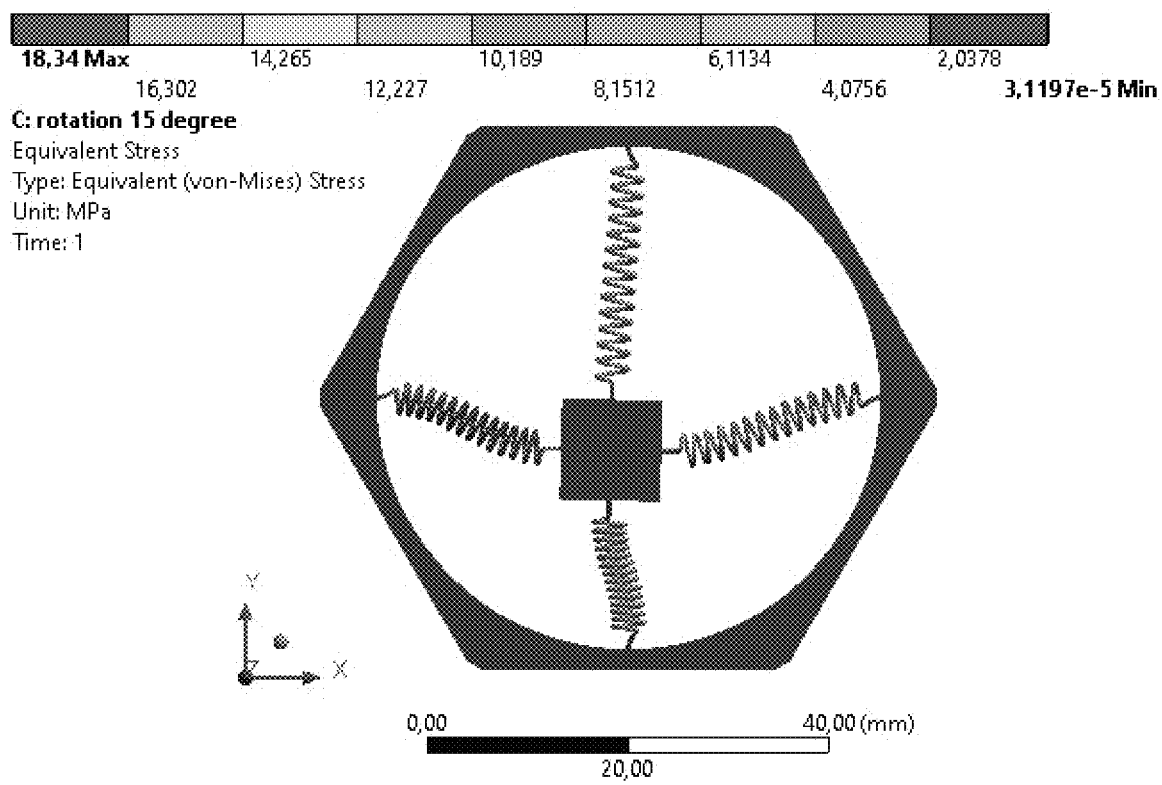
Figure 10C:
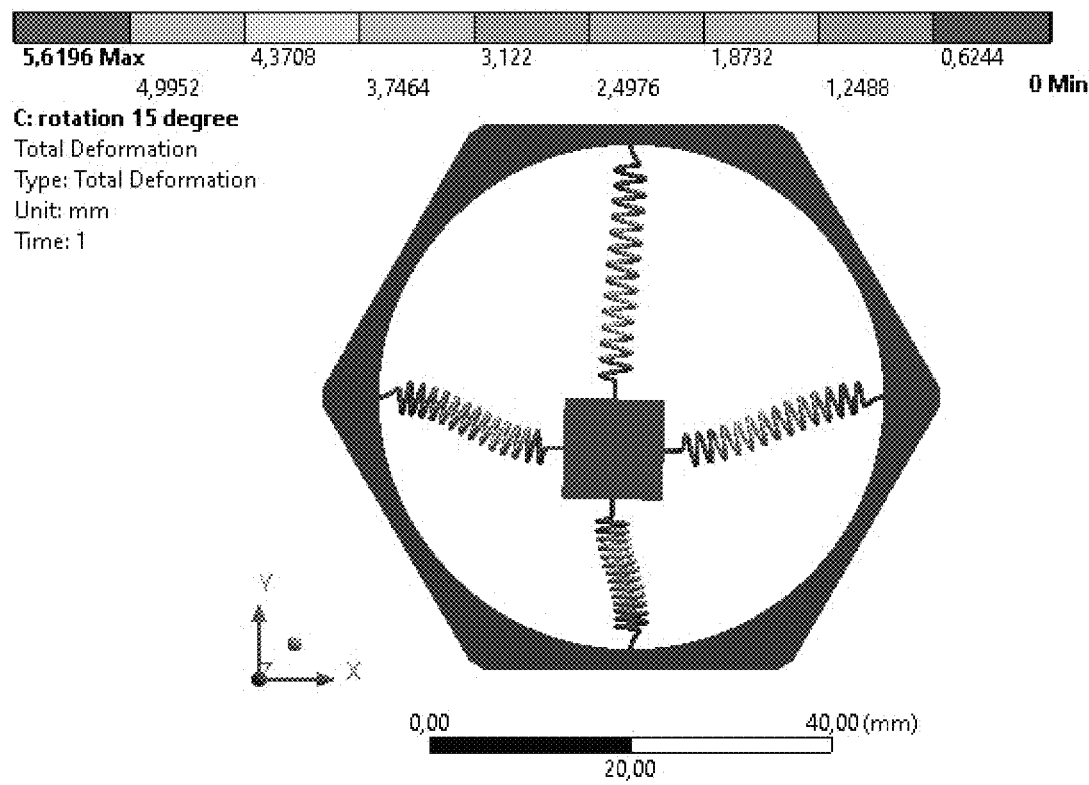

FIGS. 10A, 10B, and 10C show the results of an analysis performed by rotating the system by 15 degrees according to gravity. In FIG. 10A, total displacement, that is, X-Y plane resultant measurements, were made. The maximum displacement at 15 degrees was 5.61 mm. In FIG. 10B, the maximum tensile strength in the springs when the system is rotated 15 degrees was measured as 18.34 Mpascals. This shows that the springs work in the elastic region. In FIG. 10C, displacement with respect to the Y axis was measured as 5.32 mm.

Figure 11A:
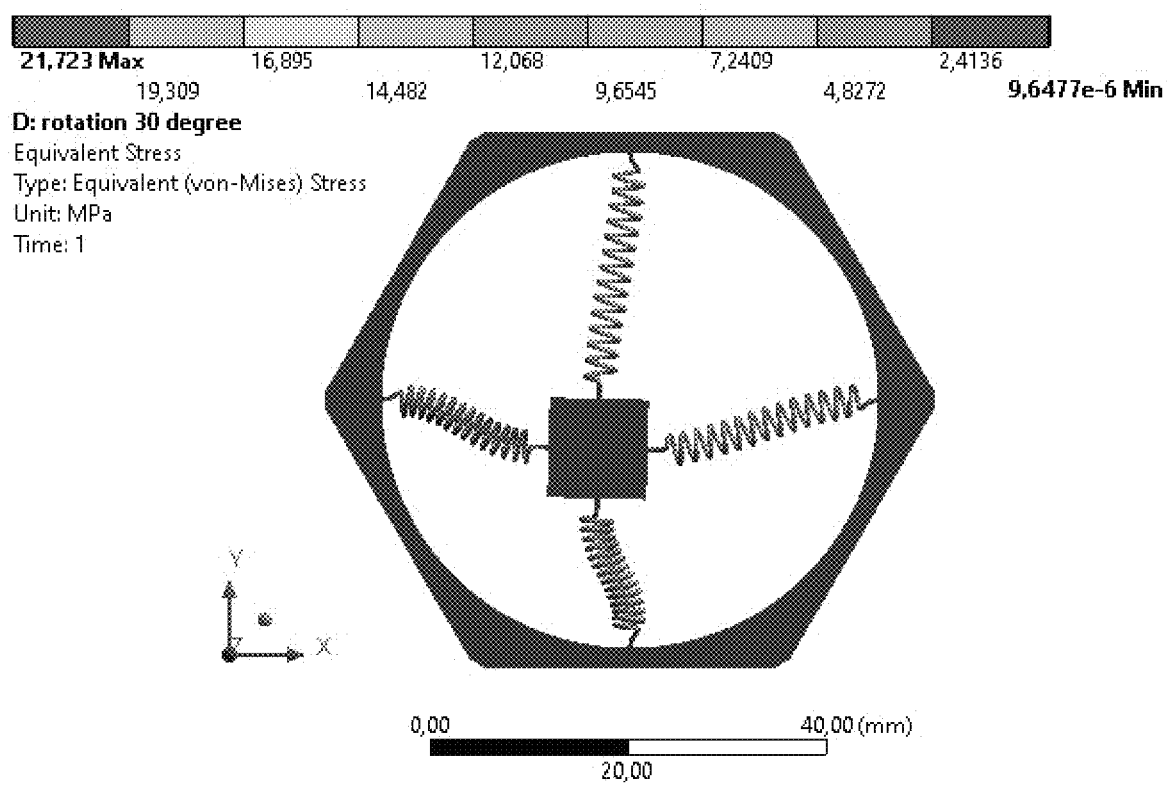
FIGS. 11A, 11B, and 11C are analysis of the system with a rotation of 30 degrees according to gravity.
Figure 11B:
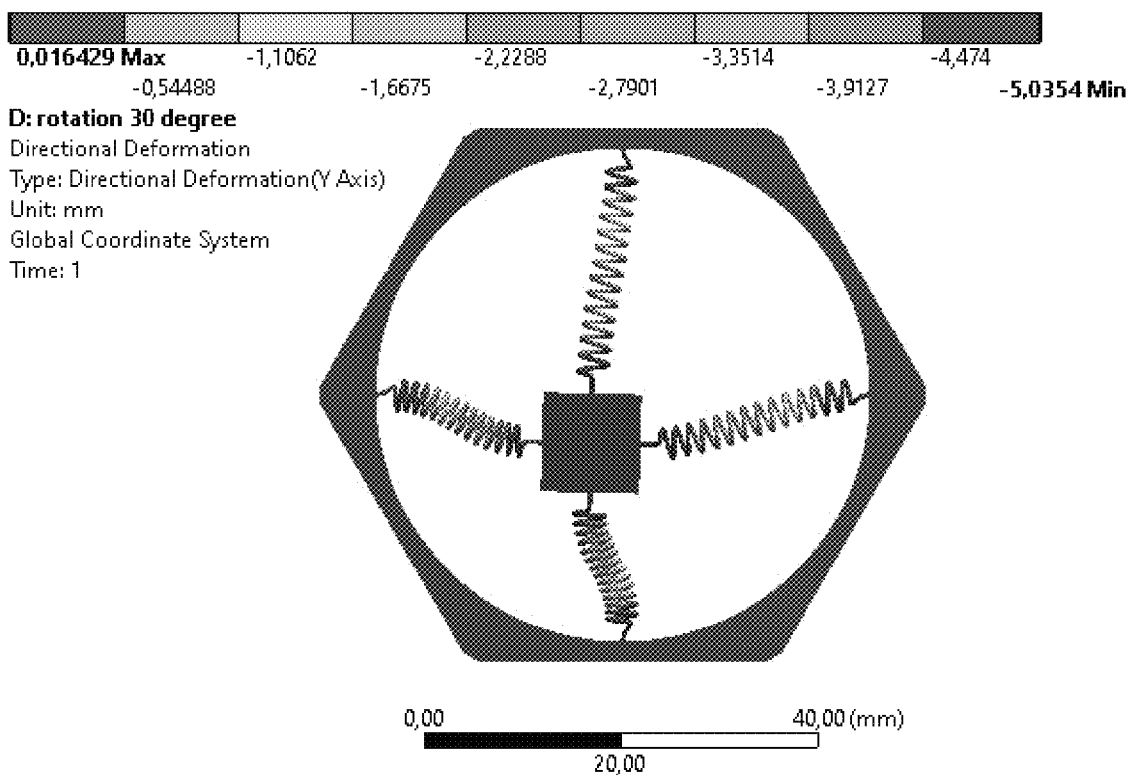
Figure 11C:
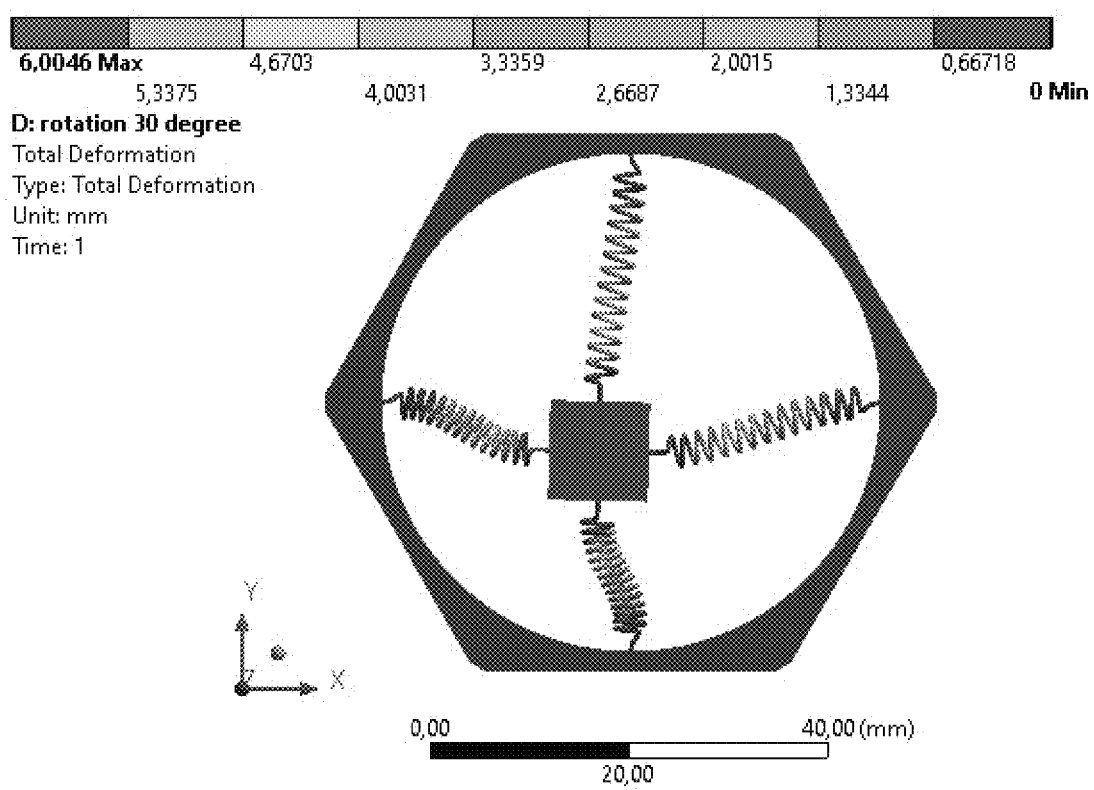

FIGS. 11A, 11B, and 11C show the results of an analysis performed by rotating the system 30 degrees according to gravity. In FIG. 11A, the total displacement, that is, the resultant X-Y plane, was measured. The maximum displacement at 30 degrees was 6 mm. In FIG. 11B, the maximum tensile strength of the springs was measured as 21.72 Mpascals when the system was rotated 30 degrees. This shows that the springs work in the elastic region. In FIG. 11C, the displacement relative to the Y axis was measured as 5.03 mm.

Figure 12A:
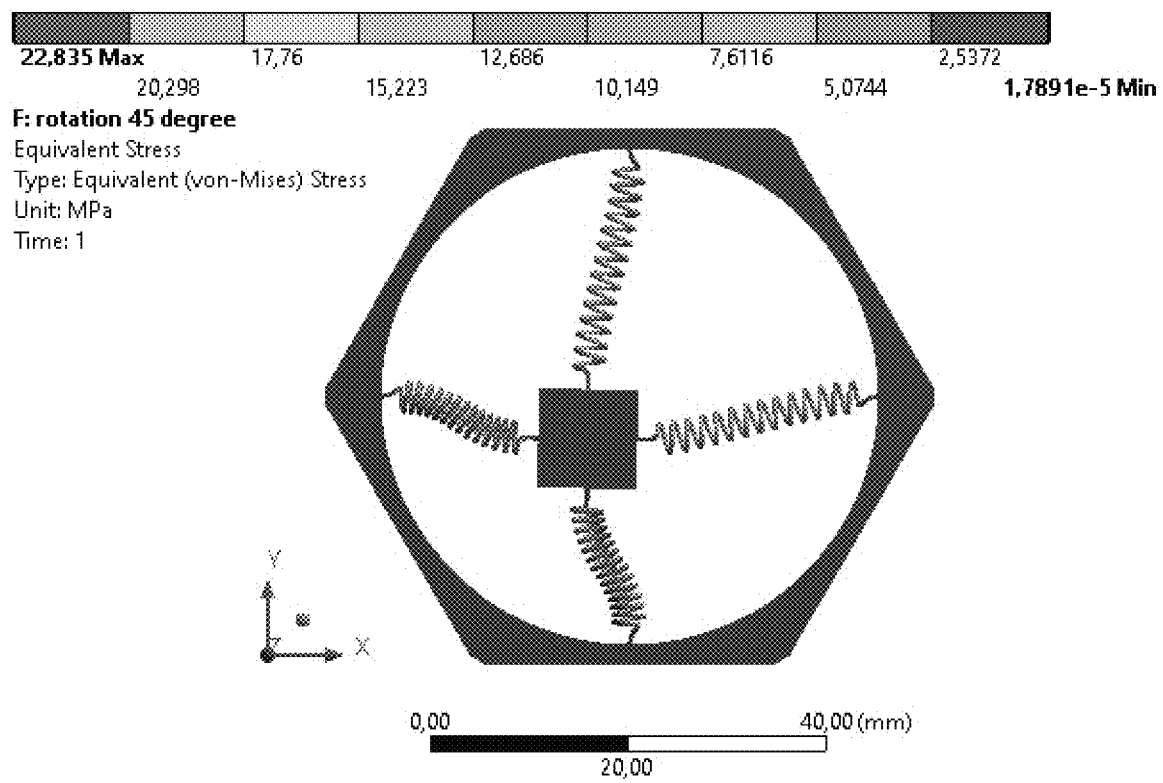
FIGS. 12A, 12B, and 12C are analysis of the system with a rotation of 45 degrees according to gravity.
Figure 12B:
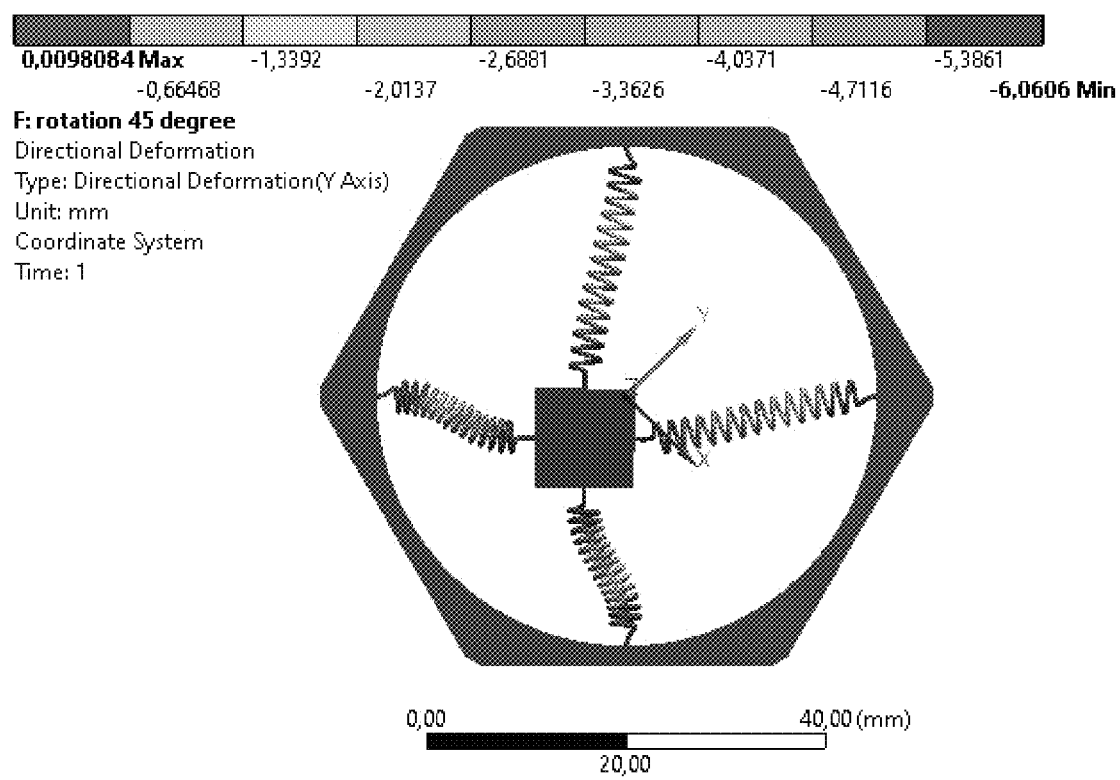
Figure 12C:
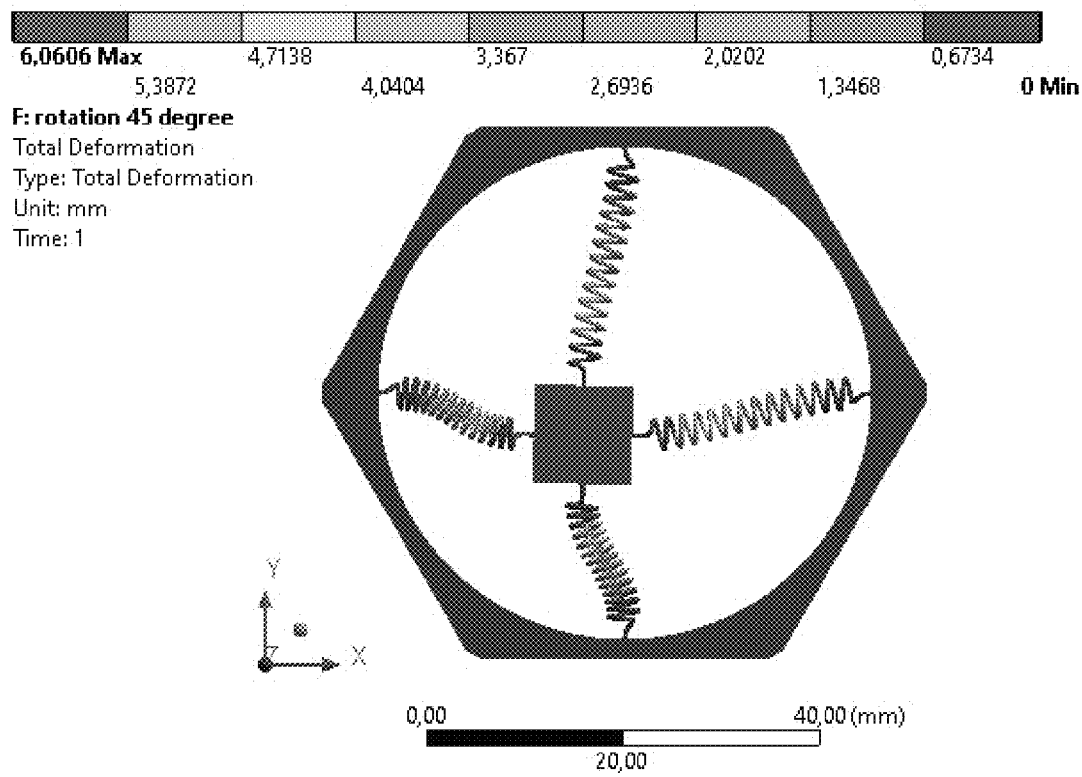

FIGS. 12A, 12B, and 12C show the results of the analysis performed by rotating the system 45 degrees according to gravity. In FIG. 12A, the total displacement, that is, the X-Y plane resultant measurements, were made. The maximum displacement at 45 degrees was 6.06 mm. In FIG. 12B, when the system is rotated 45 degrees, the maximum tensile strength in the springs is measured as 22.83 Mpascals. This shows that the springs work in the elastic region. In FIG. 12C, the displacement relative to the Y axis was measured 6.06 mm.

Figure 13A:
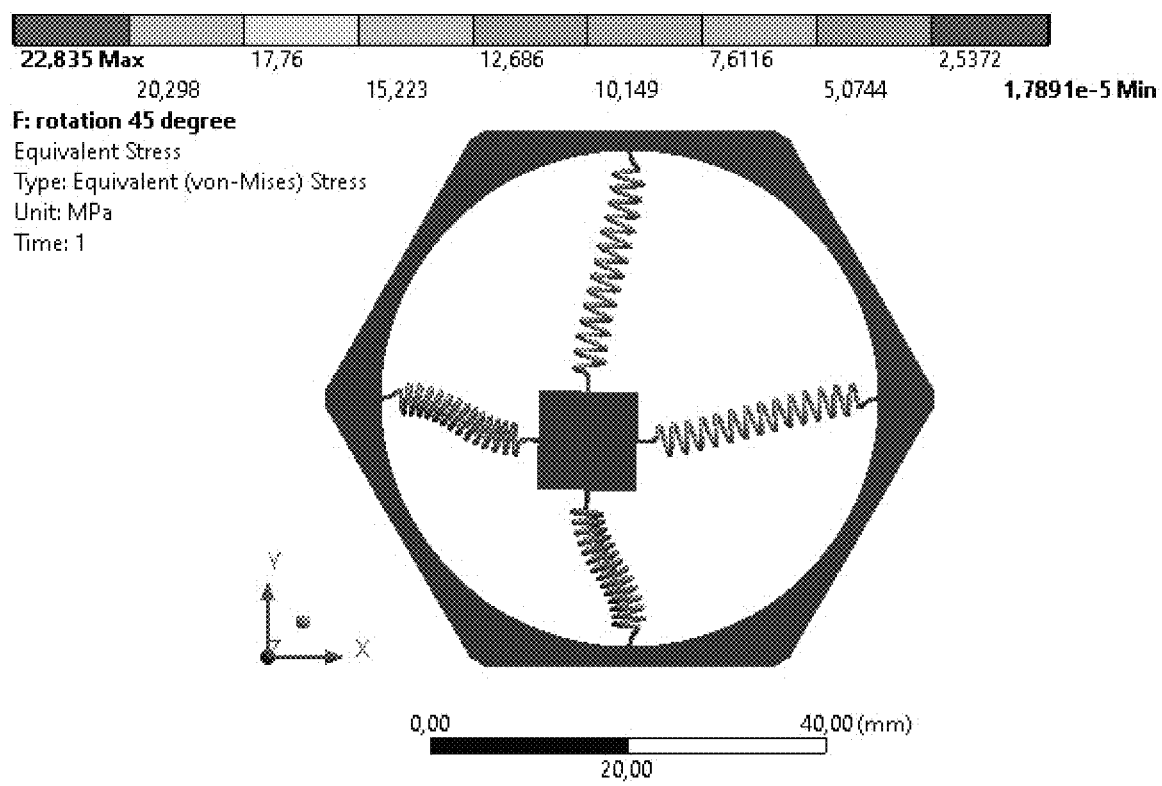
FIGS. 13A, 13B, and 13C are analysis of the system with a rotation of 60 degrees according to gravity.
Figure 13B:
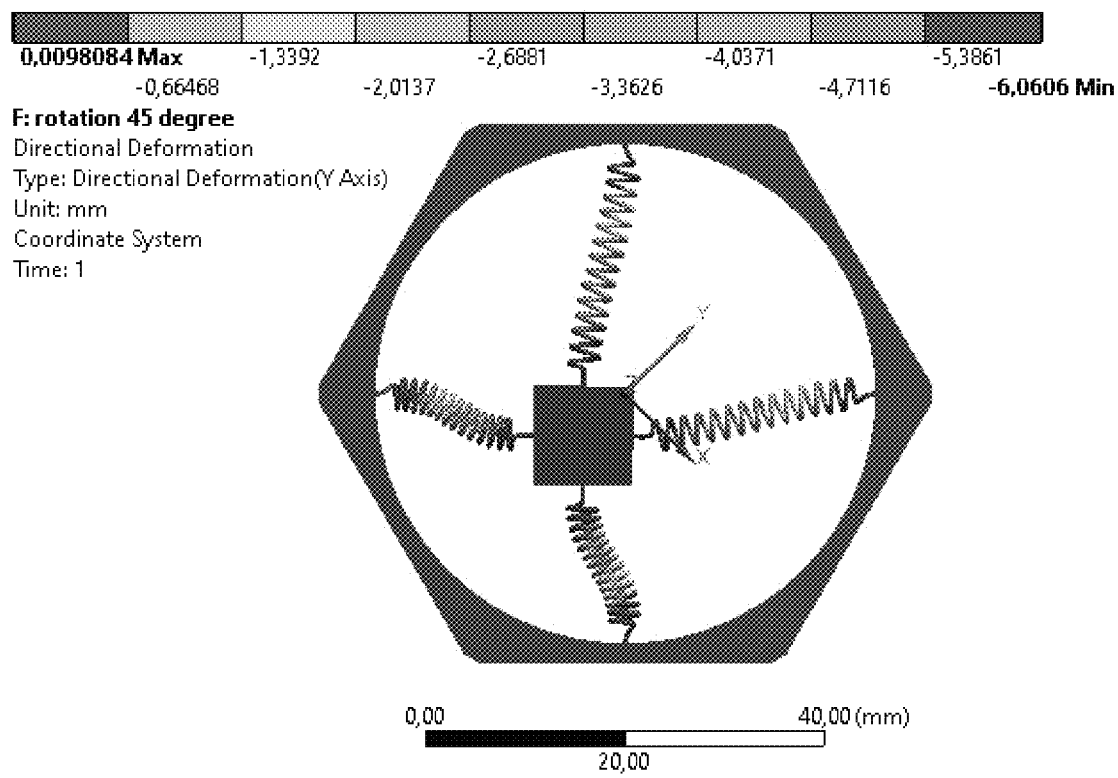
Figure 13C:
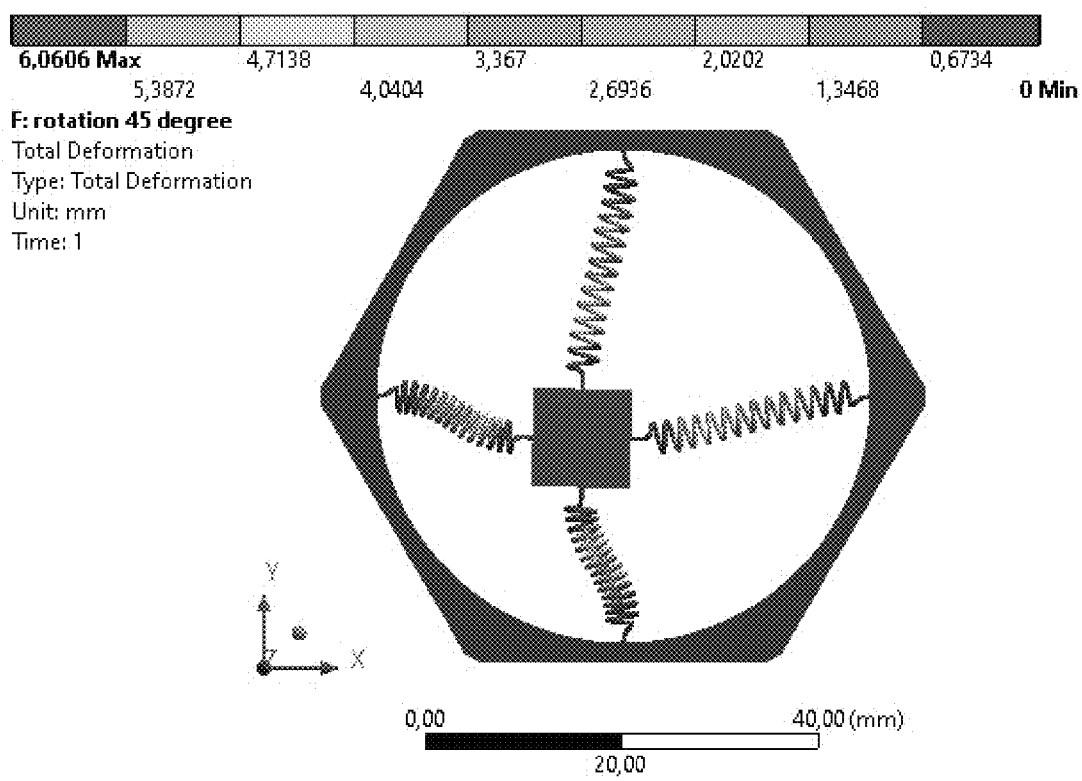

FIGS. 13A, 13B, and 13C show the results of the analysis performed by rotating the system 60 degrees according to gravity. In FIG. 13A, the total displacement, that is, the X-Y plane resultant measurements, were made. The maximum displacement at 60 degrees was 5.84 mm. In FIG. 13B, the maximum tensile strength of the springs was measured as 21.91 Mpascals when the system was rotated 60 degrees. This shows that the springs work in the elastic region. In FIG. 13C, displacement relative to the Y axis was measured as 4.91 mm.

Figure 14A:
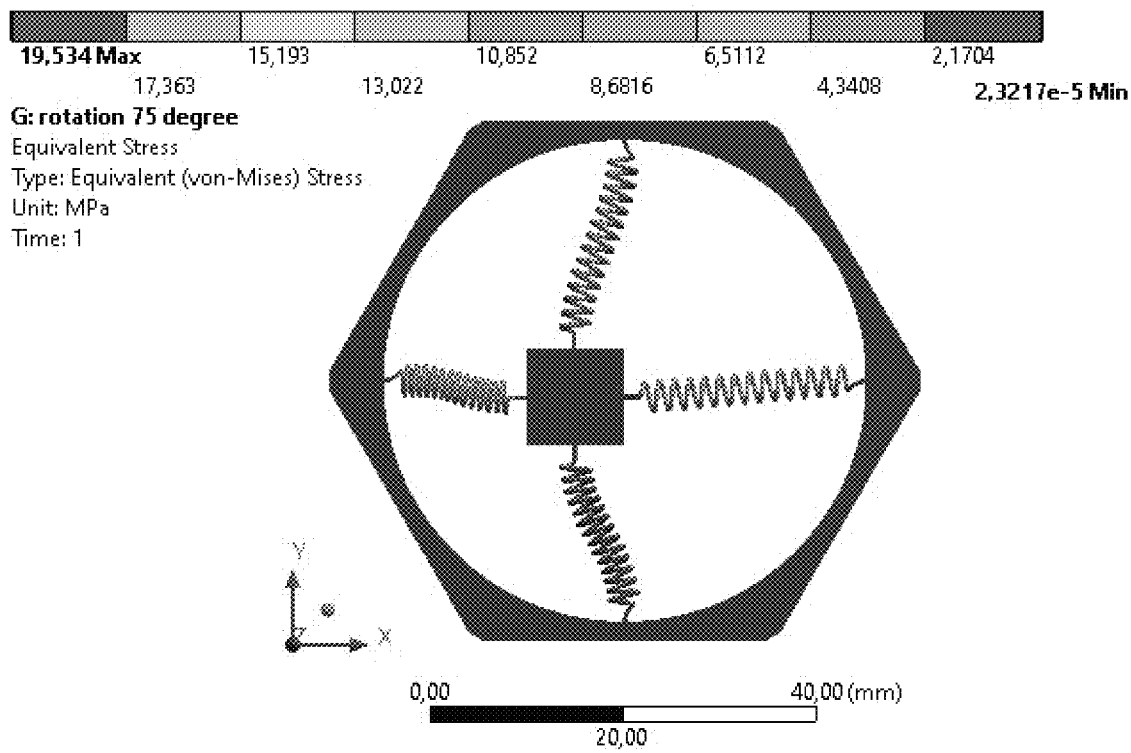
FIGS. 14A, 14B, and 14C are analysis of the system with a rotation of 75 degrees according to gravity.
Figure 14B:
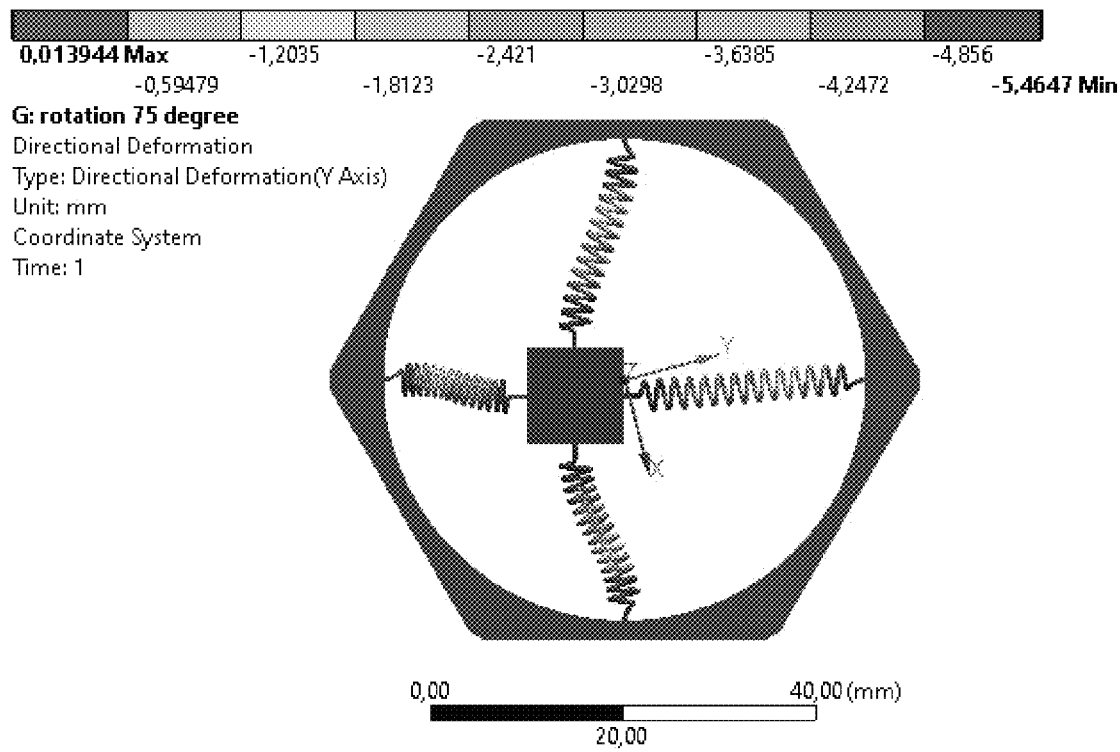
Figure 14C:
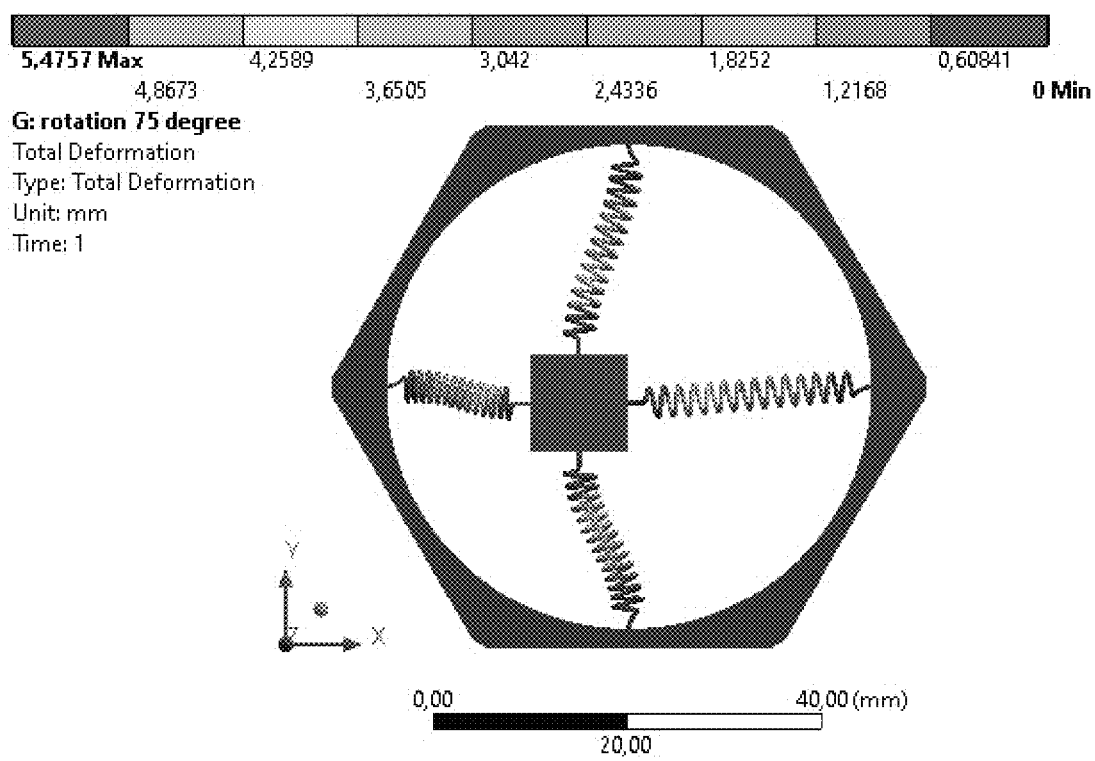

FIGS. 14A, 14B, and 14C shows the analysis results performed by rotating the system by 75 degrees according to gravity. In FIG. 14A, the total displacement, that is, the X-Y plane resultant measurements, were made. The maximum displacement at 75 degrees was 5.47 mm. In FIG. 14B, the maximum tensile force in the springs was measured at 19.53 Mpascals when the system was rotated 75 degrees. This shows that the springs work in the elastic region. In FIG. 14C, the displacement with respect to the Y axis was measured as 5.46 mm.

The results of the preceding examples are summarized in Table 2 below. The collective results show that the selected springs and magnet are suitable for an exemplary system.

TABLE 2

Spring stresses and magnet displacement according to angles.

| Case | Total Deformation X-y | Stress (Van-Mises) | Directional Deformation |
|---|---|---|---|
| 0 | 5.2663 mm | 15.03 MPa | 5.2663 mm |
| 15 degree rotation | 5.6196 mm | 18.34 MPa | 5.3214 mm |
| 30 degree rotation | 6.004 mm | 21.72 MPa | 5.0354 mm |
| 45 degree rotation | 6.0606 mm | 22.84 MPa | 6.0606 mm |
| 60 degree rotation | 5.8453 mm | 21.91 MPa | 4.9176 mm |
| 75 degree rotation | 5.4757 mm | 19.53 MPa | 5.4747 mm |

It is to be understood that the terminology used herein is for the purpose of describing particular embodiments only, and is not intended to be limiting, since the scope of the present invention will be limited only by the appended claims.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be separated from or combined with the features of any of the other several embodiments without departing from the scope or spirit of the present invention. Any recited method can be carried out in the order of events recited or in any other order which is logically possible.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described.

What is claimed is:

1. A tilt and acceleration sensor, comprising
    a body, containing a space above a floor surface that extends in a geometric plane;
    a magnet, contained within the space;
    a plurality of Hall-effect sensors arrayed around the space containing the magnet, wherein the magnet is positioned on the floor surface and the magnet and all of the plurality of Hall-effect sensors are positioned in the same geometric plane; and
    a mount configured to permit movement of the magnet relative to the plurality of Hall-effect sensors and to limit displacement of the magnet to the space, wherein:
    the mount comprises elastic elements connected to the magnet and to the body of the tilt and acceleration sensor,
    the plurality of Hall-effect sensors are configured to output signals that change in response to changes in distance of the magnet to respective ones of the plurality of Hall-effect sensors, and
    the output signals are convertible to produce-tilt and acceleration measures.

2. The tilt and acceleration sensor of claim 1, further comprising a microcontroller configured to convert the output signals of the plurality of Hall-effect sensors to the tilt and acceleration measures, wherein the plurality of Hall-effect sensors includes at least six Hall-effect sensors all of which are in the same geometric plane as the magnet.

3. The tilt and acceleration sensor of claim 2, wherein the microcontroller comprises a universal synchronous/asynchronous receiver/transmitter (USART) for outputting the tilt and acceleration measures.

4. The tilt and acceleration sensor of claim 2, wherein the microcontroller comprises a conversion algorithm formulated by an artificial neural network (ANN) to convert the signals of the plurality of Hall-effect sensors to the tilt and acceleration measures, wherein the ANN is trained using data from one or more separate inclinometers and one or more separate accelerometers which are different from the one or more separate inclinometers.

5. The tilt and acceleration sensor of claim 4, wherein the microcontroller further comprises a Kalman filter that is configured to filter noise from the output signals prior to conversion by the conversion algorithm.

6. The tilt and acceleration sensor of claim 2, wherein the microcontroller is further configured to produce the tilt and acceleration measures simultaneously.

7. The tilt and acceleration sensor of claim 1, wherein the elastic elements are a plurality of springs.

8. The tilt and acceleration sensor of claim 1, wherein the magnet is a cube magnet.

9. The tilt and acceleration sensor of claim 1, wherein the magnet is a sphere magnet.

10. The tilt and acceleration sensor of claim 1, wherein the Hall-effect sensors are configured to output the output signals as continuous analog voltage signals.

11. The tilt and acceleration sensor of claim 1, wherein the Hall-effect sensors are arranged in a configuration surrounding the magnet.

* * * * *